United States Patent
Beynon et al.

(10) Patent No.: US 7,752,537 B2
(45) Date of Patent: Jul. 6, 2010

(54) METHODS, APPARATUS, AND COMPUTER PROGRAM PRODUCTS FOR DYNAMIC GENERATION OF FORMS

(75) Inventors: Margaret Ann Ruth Beynon, Coventry (GB); Benjamin Peter Delo, Abingdon (GB); Adam Iley, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1236 days.

(21) Appl. No.: 11/306,141

(22) Filed: Dec. 16, 2005

(65) Prior Publication Data
US 2007/0044041 A1    Feb. 22, 2007

(30) Foreign Application Priority Data
Dec. 31, 2004    (GB)    ................. 0428571.4

(51) Int. Cl.
G06F 17/00    (2006.01)
(52) U.S. Cl. ................. 715/222; 715/221; 715/224
(58) Field of Classification Search .................. 715/222
See application file for complete search history.

(56) References Cited

U.S. PATENT DOCUMENTS

| | | | | |
|---|---|---|---|---|
| 5,367,619 | A * | 11/1994 | Dipaolo et al. ............... | 715/221 |
| 5,410,646 | A * | 4/1995 | Tondevold et al. ........... | 715/207 |
| 6,314,415 | B1 | 11/2001 | Mukherjee ................... | 706/47 |
| 7,315,978 | B2 * | 1/2008 | Giles ............................ | 715/221 |
| 7,350,139 | B1 * | 3/2008 | Simons ........................ | 715/210 |
| 7,447,988 | B2 * | 11/2008 | Ross ............................. | 715/221 |
| 2002/0026459 | A1 * | 2/2002 | Fernandez ................... | 707/506 |
| 2003/0101414 | A1 * | 5/2003 | Liu et al. ..................... | 715/513 |
| 2003/0110445 | A1 * | 6/2003 | Khaleque .................... | 715/505 |
| 2003/0226110 | A1 | 12/2003 | Scheering ................... | 715/513 |
| 2004/0039990 | A1 * | 2/2004 | Bakar et al. ................. | 715/505 |
| 2004/0153965 | A1 * | 8/2004 | O'Rourke ................... | 715/505 |
| 2004/0205618 | A1 * | 10/2004 | Sini et al. .................... | 715/523 |
| 2005/0071752 | A1 * | 3/2005 | Marlatt ....................... | 715/506 |
| 2005/0262429 | A1 * | 11/2005 | Elder et al. ................. | 715/507 |
| 2006/0129592 | A1 * | 6/2006 | Poozhiyil et al. ............ | 707/102 |
| 2009/0019351 | A1 * | 1/2009 | Hitchcock et al. ........... | 715/222 |

FOREIGN PATENT DOCUMENTS

| | | |
|---|---|---|
| EP | 0567834 | 11/1993 |
| WO | 013729 | 2/2004 |

OTHER PUBLICATIONS

Patents Act 1977: Examination Report under Section 18(3), UK Intellectual Property Office, Nov. 13, 2009, 3 pages.

* cited by examiner

*Primary Examiner*—Doug Hutton
*Assistant Examiner*—Zaida I Marrero
(74) *Attorney, Agent, or Firm*—Jordan Law LLC

(57) ABSTRACT

Methods, apparatus, and computer program products for dynamic generation of forms on devices such as mobile telephones. A device user enters a form descriptor code comprising a set of alphanumeric characters. A form generator applies stored mappings between the input characters and a set of electronic form components. This identifies required form components. The form generator dynamically generates an electronic form having the identified components, and displays the form on a display screen of the device. The device user completes the form and sends the completed form to a target data processing system. The dynamic generation of a form in response to a simple input code can be used to control the format of user-entered data, such that the data is validly formatted when received at the target.

17 Claims, 10 Drawing Sheets

| FORM CODE | COMPONENT CODE | COMPONENT CLIENT ID | COMPANY ID | DESTINATION(S) SPECIFIED BY COMPANY |
|---|---|---|---|---|
| ABCD0001 + OTHER INFORMATION LIKE HEADER, CHECKSUM ETC | ABCD | 1 | 100 | 07778675434 |
| ABCD0002 | ABCD | 2 | 43 | DATA@EXAMPLE.COM |
| ... | ... | ... | | |
| ABCD3451 | ABCD | 3451 | 654 | HTTP://SERVER.COM?/FORMDATA= |
| ABCD3452 | ABCD | 3452 | 59 | BUILD A SCRIPT THAT COMPANY WILL RUN ON RECEIPT, ENTERING THE DATA INTO THEIR DATABASE |
| EDFGHIJ1 | EDFGHIJ | 1 | 64 | 07712345678 |
| EDFGHIJ2 | EDFGHIJ | 2 | 100 | A DATABASE LOCATION DIRECT |
| PQRSTUV1 | PQRSTUV | 1 | 53 | MESSAGES OUTPUT TO WMQ SYSTEM |

FIG. 4

FIRST NAME:
LAST NAME:
HOUSE NAME/NUMBER:
STREET:
COUNTRY/STATE/AREA:
COUNTRY:
POSTCODE/ZIPCODE:

| 1 | ▽ |
|---|---|
| 2 | |
| 3 | |
| 4 | |

| 1 | 2 | 3 | 4 | 5 |
|---|---|---|---|---|
| | | | | |

FIG. 5A

FIRST NAME:
LAST NAME:
HOUSE NAME/NUMBER:
STREET:
COUNTRY/STATE/AREA:
COUNTRY:
POSTCODE/ZIPCODE:
SELECT WHERE YOU FOUND OUT ABOUT THIS
COMPETITOR:

| FRIEND | ▽ |
|---|---|
| MAGAZINE | |
| WEBSITE | |
| CEREAL PACKET | |

| Q1 | Q2 | Q3 | Q4 | Q5 |
|----|----|----|----|----|
| | | | | |

FIG. 5B

CUSTOMER NUMBER:

FLIGHT NUMBER:

| EZ ▽ | PLUS FOUR DIGIT NUMBER: [     ]
| BA |
| AA |
| QF |

QUERY: | SEAT NUMBER? ▽ |
| SCHEDULED FLIGHT TIME? |
| WHICH GATE FOR FLIGHT? |
| ALL OF THE ABOVE |

FIG. 5C

AIRLINE: | EZ ▽ |
| BA |
| AA |
| QF |

ELECTRONIC TICKET NUMBER:
[                    ]
ADD FREQUENT FLYER NUMBER TO BOOKING:
[                    ]

FIG. 5D

CUSTOMER NUMBER:
CREDIT CARD NUMBER:
SELECT SWITCH/VISA ETC THEN DROP DOWN THAT FORCES VALIDATION FOR NEXT BIT - EG. SORT CODE/ACC NO/ISSUE AS REQ
PRODUCT ID:

QUANTITY: 1 ▽
2
3
4

COLOR: BLUE ▽
RED
YELLOW
GREEN

FIG. 5E

POSTCODE:

PIZZA DELIVERY COMPANY NAME:
DOMINO ▽
PIZZA HUT
BOB'S PIZZA
PIZZA R US

QUERY: SEND ME A MENU ▽
OPENING TIMES?
DELIVERY TIMES?
ALL OF THE ABOVE

FIG. 5F

METHODS, APPARATUS, AND COMPUTER PROGRAM PRODUCTS FOR DYNAMIC GENERATION OF FORMS

FIELD OF THE INVENTION

The present invention relates to methods, apparatus, and computer program products for dynamic generation of forms, such as to help users of mobile telephones or other mobile devices to send information in a format that will be considered valid at its destination.

BACKGROUND

There are many situations in which businesses request information from suppliers, customers and potential customers, for example to obtain contact details, to understand customer requirements to enable targeted marketing, or to obtain feedback on existing services so that improvements can be made. Electronic forms may be completed and sent on-line to a business when ordering products and services, or to provide requested information. There are problems associated with the use of electronic forms, and each of the other known ways of obtaining requested information also has problems.

A service provider or product manufacturer may publish an order form on their Web site to enable customers to order products and services. Hyperlinks to the order form may be provided within other Web pages, or the URL for accessing the form may be published in a magazine or newspaper. A potential customer can navigate to the location of the form on the Web and then fill in the form on-line or download the form over the network for later completion. A reliable network connection is necessary for accessing and submitting on-line forms. Users of bandwidth-limited wireless devices are often reluctant to spend time navigating through a Web site to find the appropriate form, and so any requirement to locate a form via a network reduces the number of people completing the form. If storage space is limited, the device user may also be reluctant to save multiple forms onto their device. Any requirement for users to manually enter long URLs introduces the likelihood of errors.

Another option is for a corporation to transmit a form to their customers' mobile telephones or other devices when requesting information. A number of projects have proposed specifications and languages for Web-based forms (such as the W3C's XForms, the Extensible Forms Description Language (XFDL), the Form Automation Markup Language (FAML) and Wireless Markup Language (WML) forms) and some are compatible with low-bandwidth devices with a small user interface. Forms have the advantage of controlling the format in which data is entered and hence limiting the scope for user errors when entering data.

However, a broadcast solution has the problem that the form may be received correctly only by a subset of the target audience (such as, in the case of WML, users of WAP-compliant telephones that are currently switched on and accessible via the network). Even if correctly received, the recipients may still choose not to save the forms onto their devices, for example because the recipient has no interest in the form at the time they receive it, and possibly also because of concerns about wasting storage or unwillingness to incur the costs and delays of communicating with a WAP server. If a form is imposed on a mobile device user at a time when it is not convenient to complete the form, there is a high likelihood that the form will be deleted. There is a need for data collection methods which are very convenient for end users to increase the proportion of end users willing to participate.

Some corporations have attempted to collect information from potential customers via Short Message Service (SMS) text messaging. SMS messaging has the advantages of convenience and low cost, and the possibility of asynchronous message delivery by telecommunication network providers gives scalability and a degree of reliability of communications. A corporation running a competition or advertisement may invite competitors to submit entries by text messaging for these reasons, or a corporation may wish to target advertisements at young people (who often use text messaging extensively). For example, television broadcasting corporations sometimes invite viewers to use SMS messaging to vote on the outcome of a program, hoping to boost ratings by encouraging a sense of audience participation.

However, errors often arise because text messaging users fail to comply with the data format requirements of the data requester. A corporation may require responses from its customers in a particular format to enable accurate automated addition of responses to a database, and so the corporation may provide format instructions. For example, spaces between a customer's answers and commas between sections of the customer's address may be treated as delimiters within a transmitted data string that are used to control how the information within a response is entered into the corporation's database. A great many users fail to follow the instructions correctly and either enter their information incorrectly or give up because of the effort involved. These issues, and the limited screen size of many mobile devices, mean that the information requester may not solve the problem by publishing detailed instructions.

Let us assume that a corporation requires address details to be entered in a format such as 'number street name', 'district', 'city', 'postcode' (or zip code), 'country', to enable the information to be automatically entered into the correct database fields. However, the address "21 Belvue Road, Chariton, Southampton, SO19 3YT, UK" is entered by a user as "21, Belvue Road, Chariton, Southampton SO19 3YT, UK". In the absence of address validation and automatic correction, the address may be interpreted as follows:

```
'number and street name' = '21'
'district' = 'Belvue Road'
'city' = 'Charlton'
'postcode' = ERROR
'country' = 'UK'
```

The example shows how minor errors in data entry can result in database errors or input data being rejected as invalid. In this example, the ERROR message appears if 'Southampton SO19 3YT' is recognized as an invalid post code but is not automatically corrected. This example is representative of a very common problem for corporations wishing to obtain information via text messaging. The combination of formatting errors and users' reluctance to invest much time and effort typically results in a much smaller number of valid responses than the data-requesting corporation hoped for.

SUMMARY

A first aspect of the present invention provides a method for generating an electronic form on a data processing device. The method includes receiving an input of a form descriptor code comprising a plurality of characters that represent components of an electronic form in a compressed manner. The characters of the form descriptor code are compared with stored mappings between characters and electronic form components, to determine required components for an electronic form. The method then generates an electronic form that comprises the determined required electronic form components. A form generator computer program may be installed on the data processing device to interpret an input form descriptor code to identify the electronic form components that are required in the generated form, and then to dynamically generate the required electronic form.

An 'electronic form' in this context may be any electronic document or document template that includes one or more user interface components enabling user input, such as data entry fields or selection lists or gauges. For example, a simple electronic form may comprise an arrangement of labeled data entry fields into which a device user can enter their name and address or other information. Another form may comprise one or more selection lists such as a menu or radio buttons (check boxes), or a combination of entry fields, selection lists and other user input components.

The use of an electronic form can greatly increase the likelihood that data entered by a device user will be in a valid format, and so can increase the proportion of device users who provide validly formatted data to an information requester. In one embodiment, the dynamic generation of a form is performed off-line on a user's device in response to an input form descriptor code. This has the advantage that users can initiate form generation and complete the form without being affected by communication delays or gaps in wireless network coverage.

Because the form generation refers to a predefined stored mapping between characters and electronic form components, the input form descriptor codes are not themselves required to be complex descriptions of the features of a form. The input codes can be compressed identifiers of the required components of a form. In one embodiment, the form descriptor codes comprise alphanumeric character strings suitable for device users to manually enter into their device. Software running locally on the data processing device interprets the input alphanumeric character strings by comparing with stored mappings to identify required form components, and then generates a form that includes the required form components. The comparison with stored mappings may be a table lookup operation, or may comprise applying a stored mapping function.

In one embodiment of the invention, individual characters or sets of characters within an alphanumeric form descriptor code each represent one or more form components and one or more attributes of the components. An input form descriptor code is interpreted by comparing the plurality of alphanumeric characters with data held in a data repository on the data processing device. The data held in the repository comprises mappings between predefined alphanumeric characters or character sets and corresponding form components. The mappings may be indirect, with input alphanumeric characters being mapped to an intermediate digital representation (a string of 1's and 0's) which is defined to represent one or more specific form components. The intermediate digital representations may be variable-bit-length encoded representations of form components, using shorter digital bit strings for more common types of form components and common combinations of form components.

The form generation process then interprets the intermediate digital representation to identify the required set of form components, and generates an electronic form that comprises the identified form components arranged in a sequence corresponding to the sequence of alphanumeric characters within the input form descriptor code. The attributes of a component may include format restrictions and a text label to be displayed with the visual representation of the component.

In a preferred embodiment of the invention, a form generator running on the local data processing device compares an input form descriptor code with stored mappings to determine which form components to generate, and so the device does not require a reliable network connection in order to generate the form (a distinction from typical on-line forms solutions that rely on network communications to download a complete form via the Internet). Additionally, using the invention, the particular combination and sequence of form components within the generated form is not limited to the format of a previously downloaded form.

According to one embodiment, the mapping data within the repository uses an hierarchy of identifiers of form components, with form components grouped into classes according to component types. For example, certain bits of the intermediate digital representation indicate a class or type of form component, the next few bits indicate a specific form component subtype within the class or type, and subsequent bits indicate attributes of the form component. The form component type may be a data entry field and the attributes may include the maximum number of characters that can be entered, format requirements, and a label to be displayed alongside the field. Special subclasses of entry field can be defined, such as a post code entry field which implements autochecking to enforce format rules for post codes; and a data entry field may implement autocorrection to a required data format. Another type may be a list, with attributes including the number of list entries and the labels for each entry. This hierarchical organization enables a relatively small sequence of alphanumeric characters to be used to represent a large number of common form components.

As mentioned above, in embodiments of the invention in which a form descriptor code is a simple alphanumeric string, a device user may be able to manually enter form descriptor codes into their device to initiate dynamic generation of a required form on the device. Alternatively, a device user may select a form descriptor code from a list on a Web site. In another embodiment, the form descriptor code may be transmitted to the data processing device via a communications network. For example, a corporation may broadcast an information request that includes a form descriptor code to many potential customers, suppliers or employees, or may transmit the code to an individual device in response to some action by the device user. The form descriptor code may be transmitted to a data processing device as a Short Message Service (SMS) message or an Unstructured Supplementary Service Data (USSD) message or similar, which does not require a synchronous connection between the sender and target recipient.

In various embodiments of the invention, a forms generator uses a form descriptor code and stored mappings to initiate generation of an electronic form. This can provide ease of use improvements, together with the data format control offered by electronic forms, and an off-line forms generation capability.

One embodiment of the invention employs a forms generator computer program running on the data processing device. The forms generator computer program interprets a received form descriptor code, and is responsive to characters or character sets within the form descriptor code to dynamically generate corresponding form components, and then to combine the generated form components in a sequence defined by the sequence of alphanumeric character sets within the received form descriptor code. The data processing device is not required to store a comprehensive set of forms. Instead, the forms generator computer program is programmed to respond to each of a number of predefined alphanumeric character sets to generate and combine form components when required. The dynamic generation of a form component may comprise instantiating a Java™ class or other object class.

A method according to another embodiment of the invention includes the steps of storing a set of form components locally on the data processing device, and storing a corresponding set of elements of a form descriptor code in association with the form components (for example, storing form components as Java components or other software objects, and storing digital representations of alphanumeric characters that can be mapped to those components). Each of a number of form descriptor code elements may represent a respective form component, although a discrete one-to-one mapping is not essential. In response to input of a form descriptor code comprising a plurality of alphanumeric characters, the method includes comparing the input form descriptor code with stored alphanumeric characters and their mappings to form components, retrieving the locally stored form components corresponding to the input plurality of alphanumeric characters, and combining the retrieved form components to generate a form.

A dynamically generated form may be presented to a user of a data processing device via a user interface (such as a graphical user interface of the device) and the user may enter data into the form using the device's input mechanism. Alternatively, specific form components may be stored on the data processing device together with the user's personal data or together with any other data collected by the device. The generation of a form on the local device may include the step of automatically retrieving the relevant personal data or collected data when generating a corresponding form component, so as to generate a completed or partially completed form. This automated retrieval may be activated/deactivated by a device user (for example, activated for address details but deactivated for credit card details for security reasons).

Each of the above-described embodiments facilitate convenient collection of information, potentially from a large number of data processing devices, by enabling generation of electronic forms locally on each device in response to a compressed identification of required components of a form. The use of electronic forms can reduce the likelihood of erroneous data entry compared with alternatives such as conventional SMS messages.

When required data has been added to a form that is dynamically generated on a mobile telephone or another wireless-communication-enabled data processing device, the completed form may be transmitted via wireless telephone links in a conventional way. In an alternative implementation, transmission of a completed form may involve transmission of the original form descriptor code together with data entered on a mobile device by the user when completing the form.

Another aspect of the invention provides a method for generating a description of a desired form to facilitate forms generation and to reduce the amount of data transmitted when publishing forms. The method includes the steps of selecting forms components from a set of forms components and determining a desired arrangement of the selected forms components. The selected form components are compared with mappings between a set of characters and a set of form component identifiers, to identify characters to represent the desired arrangement of form components for an electronic form. A unique set of one or more alphanumeric characters may be used to represent each form component, and a form descriptor code comprising a plurality of the alphanumeric characters can represent the electronic form.

The generated form descriptor code can then be transmitted to devices having an installed forms generator program or published in advertisements to enable users to enter the form descriptor code into their devices. Once a form descriptor code is input to the user's device, the forms generator code will interpret the form descriptor code and generate the required form. The generated form descriptor code may be considered a meta data representation of the desired form, and transmission of this meta data representation avoids the need to download the form itself when requesting information.

A further aspect of the invention provides a data processing apparatus comprising a processing unit, a data storage unit, and a forms generator program for performing a method as described above. The data processing apparatus may be a mobile data processing device, and may be implemented in a network providing communication with a broker. The broker provides a form descriptor code registration service on behalf of information requesters, and in a preferred embodiment handles communications between mobile data processing devices and information requesters' computers.

A method as described above may be implemented in computer program code and may be made available as a program product comprising program code recorded on a data recording medium.

BRIEF DESCRIPTION OF THE DRAWINGS

Embodiments of the invention are described below in more detail, by way of example, with reference to the accompanying drawings in which:

FIG. 4 is an illustration of example information stored by a broker according to an embodiment of the invention; and FIGS. 5A-5F show some illustrative examples of forms and form components that may be generated according to an embodiment of the invention.

DETAILED DESCRIPTION (A) Apparatus and Solution Overview

Figure 1:
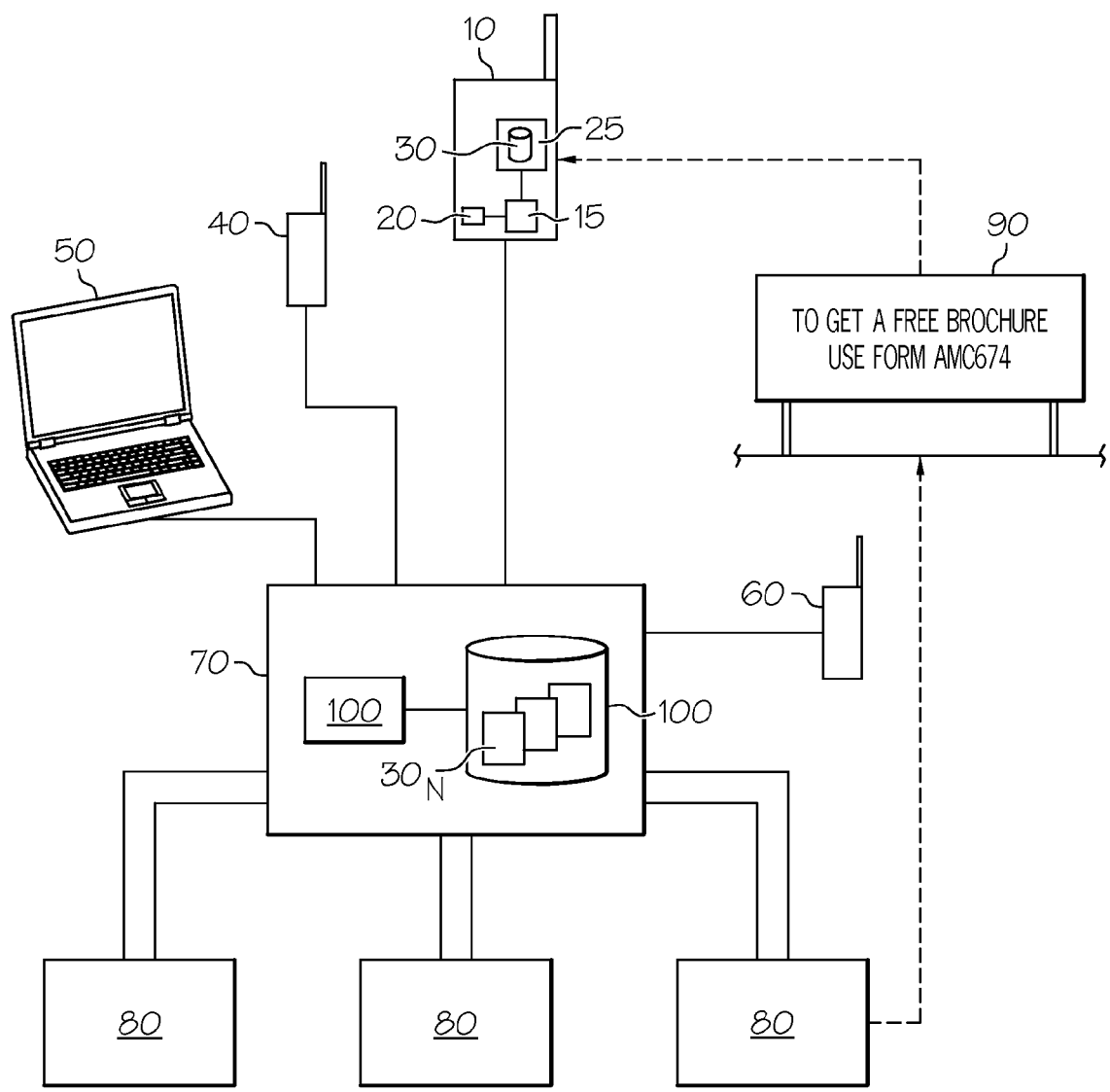
FIG. 1 is a schematic representation of a network in which a first embodiment of the present invention is implemented.

FIG. 1 is a schematic representation of a communications network in which data processing devices facilitate use of electronic forms, for example enabling users to order products or request product brochures or other information, or enabling users to enter competitions, specify their preferences or send other user-specific information. The data processing devices 10,40,50,60 include, for example, portable devices such as mobile telephones (typically having small display screens and limited memory) and personal digital assistants (PDAs), laptop computers and other data processing devices. The invention is applicable to any end-user device that includes a data processing unit and a data storage unit and is capable of running software and communicating via a network.

Each of the devices 10,40,50,60 has installed software for controlling generation of electronic forms. The forms are generated as described below, and are then typically completed manually by a device user. The completed forms are then transmitted via the communications network to an information requester's computer system 80 or to an intermediate broker 70. These two alternatives are described below.

As shown in FIG. 1, a data processing device 10 implementing the present invention includes program code 20 for execution by a processor 15 to interpret input form descriptor codes and to generate an electronic form in response to the code. This program code 20 for performing interpretation and form generation is referred to herein as the form generator 20, for ease of reference. A data storage unit 25 within the mobile device includes a data repository 30 holding a set of form components or definitions of form components, and holding a lookup table of mappings between form descriptor codes and associated representations of form components.

In another embodiment, a mapping function may be stored at the data processing device 10 instead of storing a lookup table of mappings. In either case, the mappings between input form descriptor codes and associated representations of form components enable the form components to be represented in a compressed manner.

The definition of a form component may be an instantiable object class definition, such as a Java™ class definition. Within the network, there may be any number of data processing devices 10,40,50,60 having the form generator 20 installed thereon.

The example device 10 of FIG. 1 is shown communicating with a broker 70 (for example via base stations of a wireless telephony network and onward network links, which are not shown). The broker 70 also communicates with an information requester's computer system 80, which may be any conventional or special purpose computer. The broker includes a forms manager 110 that provides a registration service—receiving registration requests from requesters' computers 80 and returning form descriptor codes to the requesters' computers—as well as providing a brokering service for routing data received from the end-user devices 10,40,50,60 to the relevant requester's computer 80. The broker may also distribute information requests to the end-user devices on behalf of an information requester, but in the embodiment described below the information requester issues publications to invite device users to submit information (without the publication being sent via the broker). For example, the information requester may publish invitations via any conventional advertisement medium 90 such as on billboards, in magazines, within television advertisements, on a Web site or within an e-mail, for example.

Other implementations of the invention do not employ a broker, but instead rely on the information requester obtaining details of the mappings between form components and characters that can be input into an end-user's device (as a form descriptor code). The information requester then publishes a form descriptor code and contact details such as a telephone number for the information requester, and interested end-users enter the form descriptor code and contact telephone number into their devices. The form generator 20 then generates an electronic form for the user to complete and transmit to the contact telephone number.

In the present embodiment, form descriptor codes comprise relatively simple alphanumeric character strings, and so a device user can read a form descriptor code from an advertisement and then type the code into their device via input keys (or speak the code into a microphone for recognition by speech recognition software, or enter the code using a pen-type input device or using another input mechanism). The form generator 20 compares the input form descriptor code with a stored table 30 of mappings between form descriptor code elements (alphanumeric characters or sets of characters) and digital data strings representing electronic form components. The comparison identifies a set of digital data strings, which are then interpreted to identify the relevant form components. An instance of each of the identified form components is then generated—and arranged in a sequence corresponding to the sequence of characters of the form descriptor code. The input form descriptor code may specify form components and attributes of those components such as text labels associated with a data entry field or associated with a set of check-boxes. This is described in more detail below.

In addition to specifying components and attributes of an electronic form, the alphanumeric characters within a form descriptor code may represent a number of different items of data. According to one embodiment, a form descriptor code comprises:

- a Header that specifies a type of code, a version number and an expiry date.
- a Component Identifier that specifies components and attributes for the form to be generated. As described below, this Component Identifier may be mapped to a variable bit length encoding of form components. Common components such as entry fields labeled 'Name' and 'Address' can be given shorter encodings than components with less common labels such as 'favorite color'. Common groupings of form components such as 'Name, Address, Telephone' may also have relatively short encodings.
- Addressing information, such as a ClientID (described below in the context of a broker-based implementation) or direct addressing information for an information requester (such as an SMS number, e-mail address or a URL for HTTP transfer).
- a Checksum. This option addresses the likelihood that some users will incorrectly enter one or more characters of a form descriptor code. The checksum may be one or more characters representing the results of a 5-bit 'exclusive or' (XOR) operation applied to the other elements of the form descriptor code. When a checksum is implemented, the form generator 20 will validate a user-entered form descriptor code by computing the checksum value and comparing with the encoded checksum before displaying the form on the data processing device.

The use of the 'Component Identifier' information and addressing information of a form descriptor code is described below in more detail for a number of possible embodiments of the invention.

Interpretation of an input form descriptor code by the form generator identifies required electronic form components, and the sequence of characters within the form descriptor code indicates the required arrangement of the form components within the form to be generated. Having determined the required components and the required arrangement by reference to the mappings in the data repository 30, the form generator 20 instantiates Java classes in the required sequence to generate a form. The implementation and operations of the form generator are described below in more detail, followed by further details of the broker.

(B) Form Generator

The form generator program code 20 is implemented as a MIDlet; that is, a Java™ application program implementing the J2ME's (Java 2 Platform, Micro Edition) Connected, Limited Device Configuration (CLDC) and Mobile Information Device Profile (MIDP) specifications. CLDC lays out the application program interface (API) and virtual machine features needed to support mobile devices. MIDP adds to the CLDC the user interface, networking, and messaging details needed to interface with mobile devices. The MIDlet runs within the J2ME's virtual machine environment (known as the K Virtual Machine) on the data processing device 10. Java MIDlets are currently compatible with a large number of mobile telephones.

As explained earlier, the form generator 20 implements decoder functions for mapping characters of an input form descriptor code to bit string representations of form components and interpreting the bit strings to identify the required form components and attributes. The decoder functions convert a compressed identification of form requirements to an expanded form. The form generator also implements functions for instantiating object classes to generate the identified components in a sequence to create an electronic form. Each of these functions is described below in more detail.

(C) Mapping Input Characters to Digital Representation, and Interpreting

Table 1 shows a first example mapping between form descriptor code elements (individual alphanumeric characters selected from the range 0-9 and A-Z, in this example) and 5-bit digital representations of the form components. The 5-bit representations are an intermediate value in the mapping between respective alphanumeric characters of the form descriptor code and respective form components or component attributes. Each of the alphanumeric characters of Table 1, and combinations of these characters, can be included within a form descriptor code.

TABLE 1

| DESCRIPTOR CODE ELEMENTS | DIGITAL FORM REPRESENTATIONS |
|---|---|
| 0 | 00000 |
| 1 | 00001 |
| 2 | 00010 |
| 3 | 00011 |
| 4 | 00100 |
| 5 | 00101 |
| 6 | 00110 |
| 7 | 00111 |
| 8 | 01000 |
| 9 | 01001 |
| A | 01010 |
| B | 01011 |
| C | 01100 |
| D | 01101 |
| E | 01110 |
| F | 01111 |
| G | 10000 |
| H | 10001 |
| J | 10010 |
| K | 10011 |
| L | 10100 |
| M | 10101 |
| N | 10110 |
| P | 10111 |
| Q | 11000 |
| R | 11001 |
| W | 11010 |
| T | 11011 |
| U | 11100 |
| V | 11101 |
| W | 11110 |
| Z | 11111 |

Sequences of these five-bit digital representations are used to represent form components and complete forms. The digital representations each serve as an identifier of a location within an hierarchy of classes and types of form components.

Figure 2A:
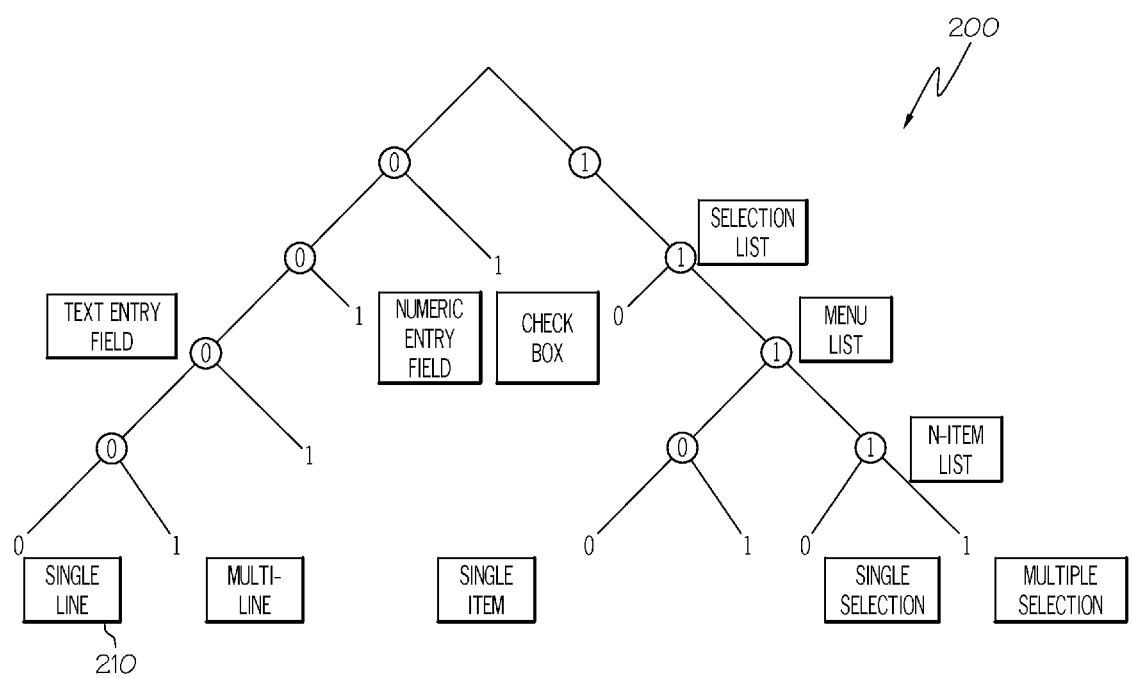
FIG. 2A represents an example part of a form component class hierarchy, and showing the representative bit strings for identifying types of form component.
Figure 2B:
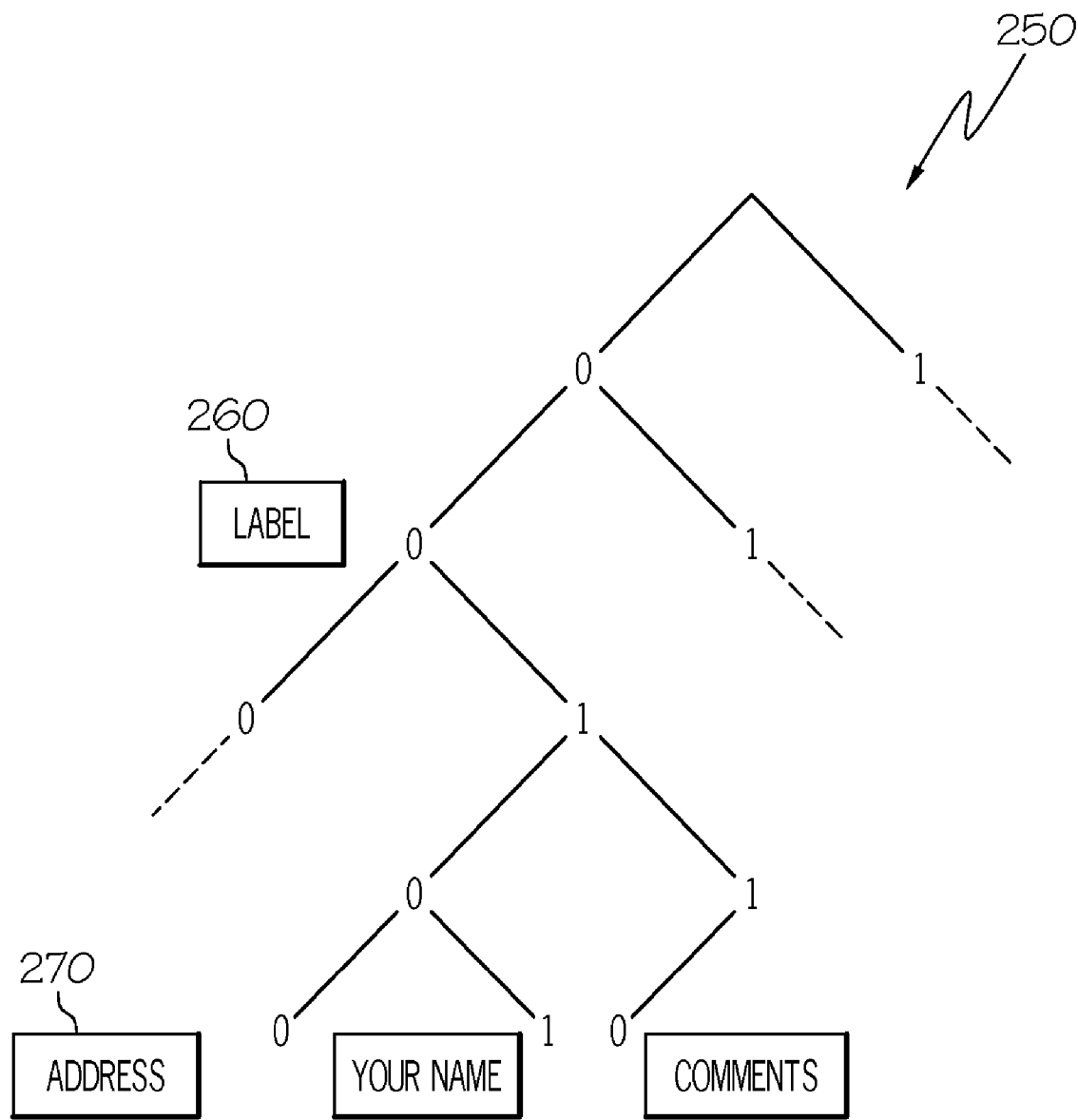
FIG. 2B represents an example part of an attributes class hierarchy, and shows the corresponding bit strings for example nodes of the hierarchy.

On receipt of a form descriptor code by the form generator 20 running on a data processing device, the form generator applies the above mappings to the input code to identify a corresponding set of five-bit digital representations. The digital representations are then compared with the hierarchy of types of form components to identify the components that are required for the new form, and to identify attributes for the components. An exemplary branch 200 of an hierarchical classification of form component types is shown in FIG. 2A, and an example portion 250 of an hierarchical classification of component attributes is shown in FIG. 2B.

In the example of Table 1, an input form descriptor code 04MU maps to a set of digital representations 00000, 00100, 10101 and 11100. The form generator 20 is configured to use the hierarchical classification of form component types (such as in FIG. 2A) to interpret the first digital representation as specifying a form component class and type (for example, the initial bit string 00000 indicates a location 210 within the hierarchy 200 associated with a single line text entry field, with the first 3 bits indicating a text entry field and the last 2 bits indicating the single line subclass of the class of text entry fields). Subsequent digital representations within the set indicate attributes of the form component.

Using the example input form descriptor code 04MU, the form generator 20 interprets the second digital representation 00100 as specifying an attribute type and a text label—such as the first 2 bits indicating an attribute type 260 (Type="label"), and the latter 3 bits indicating the specific label 270 (Label="Address"). This is represented within the branch 250 of an hierarchical classification of attributes shown in FIG. 2B. The bit values are used to indicate a path through the hierarchy to a particular location within the hierarchy, and a particular attribute is associated with that location. The third and fourth digital representations 10101 and 11100 may represent further attributes of the text entry field, such as additional text labeling. If the form is to include multiple components, the 4 alphanumeric characters above are followed by multiple sets of 4 characters.

In some applications, a four character form descriptor code will not be required to specify a single form component. For example, if the required text labeling is a very common word or phrase such as 'Name&Address', a shorter form descriptor code can be sufficient. It can be seen in the example above that the two characters 04 of the set of characters 04MU may be sufficient to fully describe a required text entry field, especially when a mapping of input characters to multi-bit digital representations is implemented. In such cases, a sequence of pairs of characters may be used to specify a plurality of required form components and the sequence of the character pairs can indicate the required arrangement of components within the final form.

For example, in an alternative to the embodiment represented in FIG. 2, the example digital representations 10101 and 11100 corresponding to characters MU in Table 1 may specify a further component class (e.g. selection list) and type within the class (e.g. text labeled drop-down menu) and attributes for this component (e.g. number of items in list and labels for each). In this second example, input form descriptor code 04MU indicates a multi-component form in which a text entry field is followed by a selection list.

The mappings between input alphanumeric characters and digital representations of form components shown in Table 1 are merely exemplary. A great many alternative mappings may be defined between input characters and representations of form components. The number of characters chosen to represent required form components will typically be influenced by the number of bits which map to each character, as well as the number of supported form component types, the number of options for component labeling and other complexities of the required forms. Thus, a five-bit digital representation is merely one example—various other bit lengths may be chosen when defining mappings between the alphanumeric characters and the bit strings representing form components.

Variable bit length encoding could be used to enable common form components to be represented using a short bit string, whereas less common components can be represented using a longer bit string. A variable bit length implementation may include a delimiter character within the form descriptor codes, between the character sets describing different form components, but this is not essential as long as each element of the bit string generated from an input descriptor code can be uniquely identified with a form component, component attribute or client ID (described below).

As shown in the above examples, a simple electronic form—such as a form comprising a simple set of one or more data entry fields or selection lists—can be represented using a simple alphanumeric character string.

In an embodiment of the invention that includes a broker, some characters within the alphanumeric form descriptor codes may be used to specify customer-specific information. For example, a form descriptor code OBGQ may be mapped to digital bit string representations 00000, 01011, 10000, 11000 (see Table 1). As in the previous example, bit string 00000 represents a single line text entry field 210. Bit string 01011 specifies that the field is to be labeled, that the labeling for the entry field is to be found in a dictionary held at the data processing device (and at the broker). The bit string may specify a particular dictionary, but each data processing device in the network preferably has a standard dictionary installed on the device. Digital representations 10000 11000 produced by mapping the input code elements GQ may identify one or more specific words within the dictionary (since each word or phrase can be associated with a bit string for lookup purposes). Thus, in this example, the customer-specific information is a selection of one of a plurality of dictionaries and the words selected from that dictionary.

In many cases, multiple dictionaries are not required because an N-bit string (such as the 10-bit string of the above example) is considered sufficient to identify individual words or phrases in a single dictionary held at the broker and replicated to end-user devices.

The above examples show the flexibility for implementors of the present invention when defining what the digital bit strings represent, as well as the flexibility when defining mappings between input characters and their representative digital bit strings. This flexibility also provides scalability, in the sense that any number of required components and attributes such as a large number of labeling options can be supported. The longer the chosen bit length for digital representations that map to each character in the form descriptor codes (5 bits is merely a first example), the more detail can be specified in a simple set of alphanumeric characters.

If multiple dictionaries can be held at a data processing device, a data element within the input characters may specify which dictionary to use and a second character can indicate a word within the dictionary. This is a further example of the flexibility and scalability of the mappings between input descriptor codes and electronic form components and attributes, which enables any required labeling to be used for form components. Similarly, customer-specific dictionaries may be held at the broker which equate to the different dictionaries stored on different data processing devices.

Further details of functions provided by, and information stored at, the broker is described below, beneath the more detailed description of form generation.

(D) Form Generation

The form generator program code 20 includes a set of object classes that are each instantiable to generate a different type of electronic form component. In an example implementation represented in FIG. 2A, object classes are provided for each of a set of component types, such as the following examples:

(1) A text entry field (single line)
(2) A text entry field (multi-line)
(3) A numeric entry field
(4) A menu (selection list)
(5) Checkboxes (selection list)
(6) Radio buttons (selection list)

Up to 8 different types of form component, such as the example list above, can each be referenced numerically using as few as 3 bits—by assigning one of the bit sequences 000, 001, 010, 011, 100, 101, 110, 111. Alternatively, a larger number of component types can be referenced using longer or variable length bit strings. For example, a numeric entry field for telephone numbers may be identified separately from other numeric entry fields on a mobile telephone so that an in-built format check can be applied to telephone numbers. Other data entry fields may be specific to date and time information, such that date and time formatting can be automatically applied.

As shown in FIG. 2A, items 1 and 2 in the above list can be provided as separate subclasses of a data entry field class in a hierarchy of form component types. Potentially, item 3 could also be a subclass of entry field, but is a separate component type in the hierarchy of FIG. 2A. Items 4, 5 and 6 and other selection components may be implemented as separate subclasses of a selection list class.

As described above with reference to FIG. 2A, the mappings between representations of electronic form components and characters within the form descriptor code include mappings for a number of electronic form components (for example, each of the above-described types 1-6 and others). Additionally, other characters are used to specify particular labels and component options within each of these types—as attributes of a class of form component. The Attributes may be organized in a hierarchy such as shown in FIG. 2B. For example, a character set indicating a multi-line entry field may also indicate that the entry field is for entering users' comments, and should be labeled as such when displayed on the device screen (for example, the character set indicates a required label attribute of 'COMMENTS').

The form generator 20 interprets the digital representations that result from applying the mappings, using the bit values of the digital bit strings to step through the Java class hierarchy of components and hierarchies of attributes. The form generator then instantiates the identified object classes to generate an instance of the specified type of form component having the specified attributes.

A character set specifying a single line text entry field may include a character that indicates that the text entry field is a Name field and should be labeled as such (for example, a label attribute 'YOUR NAME'; or there may be separate fields with label attributes 'FIRST NAME' and 'LAST NAME'). The respective attribute requirements are applied when generating an instance of a form component. Other characters may indicate that a text entry field is intended for entering an address, or separate fields for entering lines of an address, and should be labeled appropriately:

HOUSE NAME/NUMBER
STREET
TOWN/CITY
COUNTY/STATE
POSTCODE/ZIPCODE
COUNTRY

Similarly, a character set associated with a selection list may be followed by a character or character set indicating options such as how many choices the list will include, and required labeling for the choices within the list. This labeling may be as simple as numbering the options if, for example, the selection list is to invite users to choose between 3 options and if additional text labeling is considered superfluous because the 3 options are clearly described in the advertisement that the user is responding to. An example of such a situation is where a television show invites telephone users to vote on which participant of the television show should be declared the winner or suffer a forfeit—the invitation may provide the form descriptor code and explain that options 1,2,3 represent specific named individuals, such that the electronic form itself is not required to display the participants' names. The generated form then includes a selection list having the correct number of items and the required labels, and this can be represented more simply than if the individual's names are recreated within the form.

Again, the above examples indicate the flexibility for implementors of the invention—in this case flexibility for information requester's to choose what labeling to apply and other options. A standard selection list with N selectable list items can have different meanings for different information requesters and information requesters can choose what level of detail to include in their labeling of form components, subject to the generated electronic form being understandable by its target audience.

Where more specific text labeling is required for the components of a form, additional form descriptor code characters may be assigned for that purpose (i.e. entries for the particular label attributes may be stored in the mappings table on the mobile device, and at the broker).

Thus, by predefining alphanumeric character sets to represent each of a number of different types of electronic form component and their required labeling, multiple electronic form components and corresponding different labels can be represented within a user-entered alphanumeric character string. By storing the mappings on a user's device and providing a set of object classes for the set of form components, electronic forms can be generated as required on a user's mobile device.

The form descriptor code may be published together with a telephone number to which the generated form (or the form content and form descriptor code) should be sent. For example, generated forms may be sent from a mobile device to the information requester's computer 80 or broker 70, using the Short Message Service (SMS). In another embodiment, the mobile device implements the communication protocols of the Wireless Application Protocol (WAP) specification, to send data from the MIDlet 20 on a mobile device to the broker 70 or information requester's computer 80 as Wireless Markup Language (WML) content.

In yet another embodiment, the form descriptor code includes a character or character set which has been registered with the broker as an identification of an information requester entity. That is, a number of information requesting enterprises may register with the forms manager 110 of the broker and the forms manager 110 assigns them a client ID character set for inclusion in form descriptor codes. Client IDs are not required to be universally unique, but in this embodiment are unique for a given form descriptor code that is registered at the broker. This has the advantage of allowing variable bit length encoding to be applied to client IDs and form descriptor codes. A commonly used form component (having many registered users) is assigned a relatively short set of representative characters, but more bits are required to differentiate different users; whereas a less common form component (for which a longer character string may be required) has a smaller number of users and so a smaller number of bits is required to differentiate between users.

Any forms received by the broker which include a particular information requester entity's client ID character set can be forwarded by the broker to the relevant entity, since addressing information is stored at the broker. In one such embodiment, unique requester-entity-identifying characters have a predefined position relative to other characters within their respective alphanumeric character strings. This predefined position may be, for example, the first 2 characters or the last 2 characters. Such an adoption of a convention on what type of information is represented by characters at certain positions within an input character string can simplify interpretation of input characters.

The length of the character set used as an identifier of the information requester entity (ClientID) may vary according to the number of entities expected to register with the forms manager 110 of the broker to use a particular type of form—for example, using a longer character string for the ClientID when a requester entity registers to use a common predefined form. This can provide a scalable solution, and longer ClientIDs may be balanced by common predefined forms only requiring relatively short input character strings to identify them.

The form generator 20 installed on the mobile device is configured to respond to an input form descriptor code by comparing the input form descriptor code with the stored table of mappings, and using the component class hierarchy to identify required electronic form components, required labeling and options, and the required arrangement (i.e. sequence) of components within the particular form. The form generator program code instantiates Java classes corresponding to the identified required component types, applying the required labels, and displays the resulting form via the mobile device's user interface.

The user is then able to enter data into the data entry fields and to make selections from the selection lists using the normal user input mechanisms of the user's device (for example, using buttons/keys or a pen-type device on a mobile telephone or PDA). The user-entered data, the ClientID and the form descriptor code (or the complete generated form) are then sent via SMS or WAP messaging to the broker. Addressing information for the broker may be hard coded into the user's device such that this information can be omitted from form descriptor codes. The broker routes received messages to the client system 80 identified by the ClientID, or aggregates the data from the messages that it receives and forwards aggregate or summary data to the client system.

(E) Interaction Between Form Generator, Broker and Information Requesters

Figure 3A:
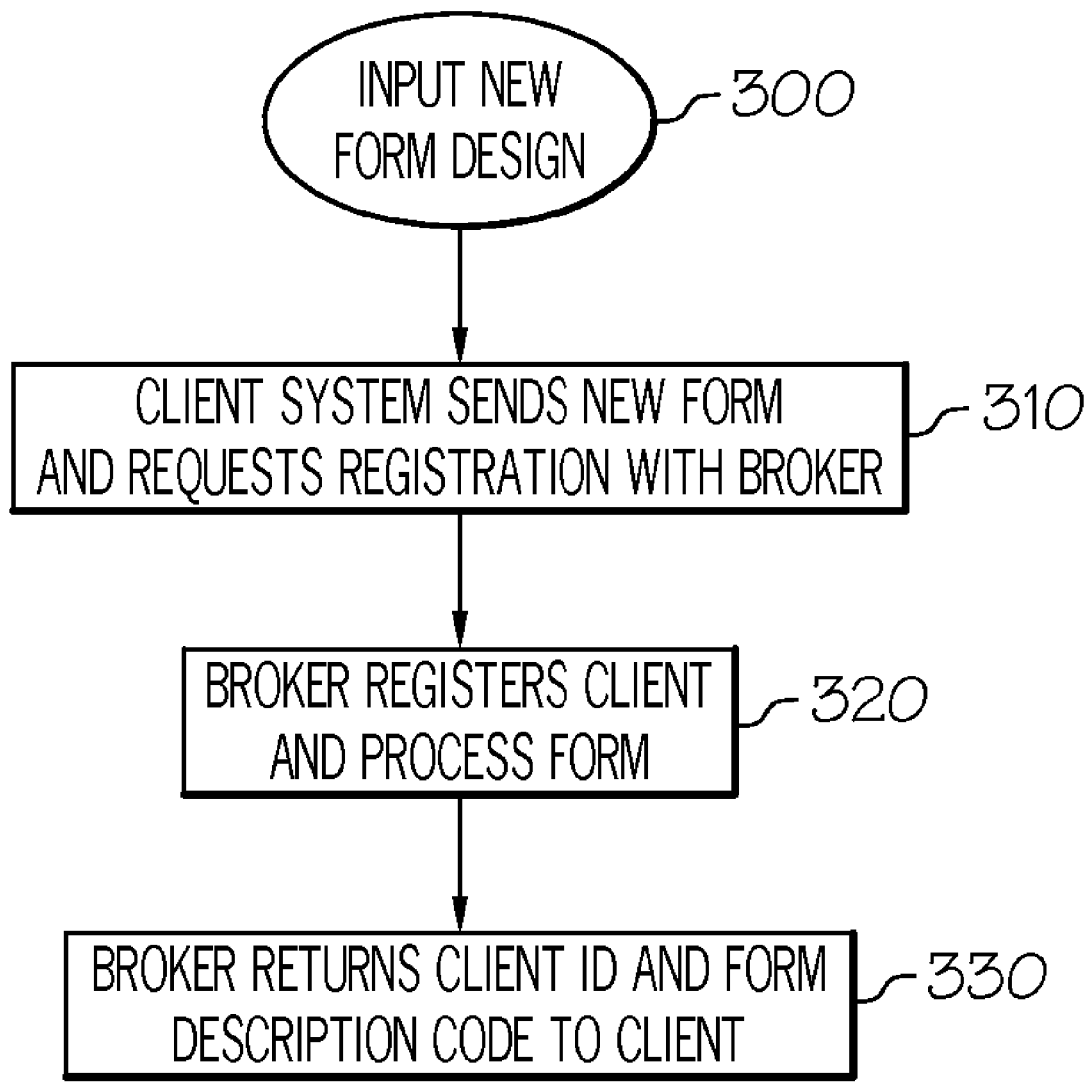
FIGS. 3A-3C represent a number of operational steps within a method according to an embodiment of the invention.
Figure 3B:
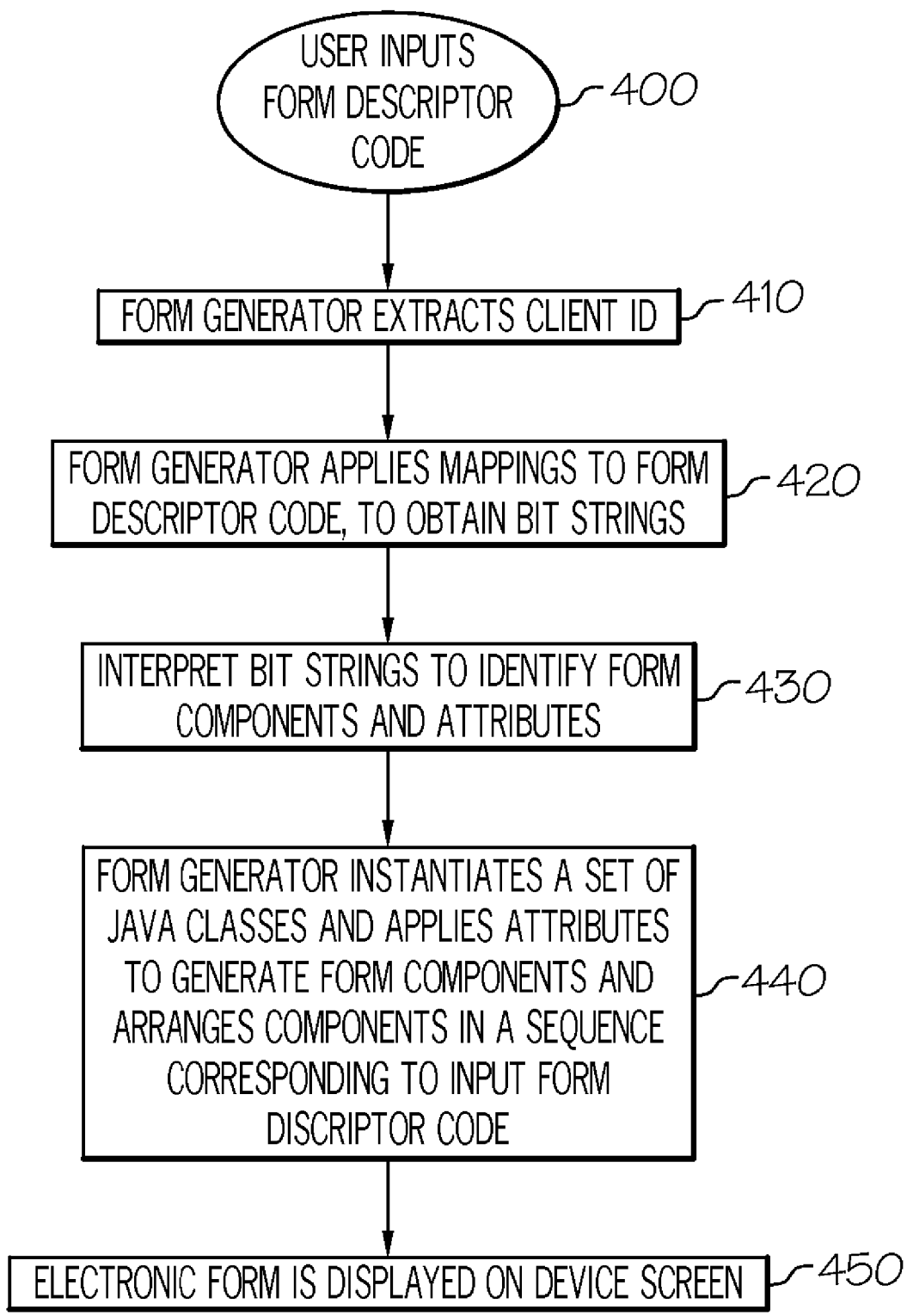
Figure 3C:
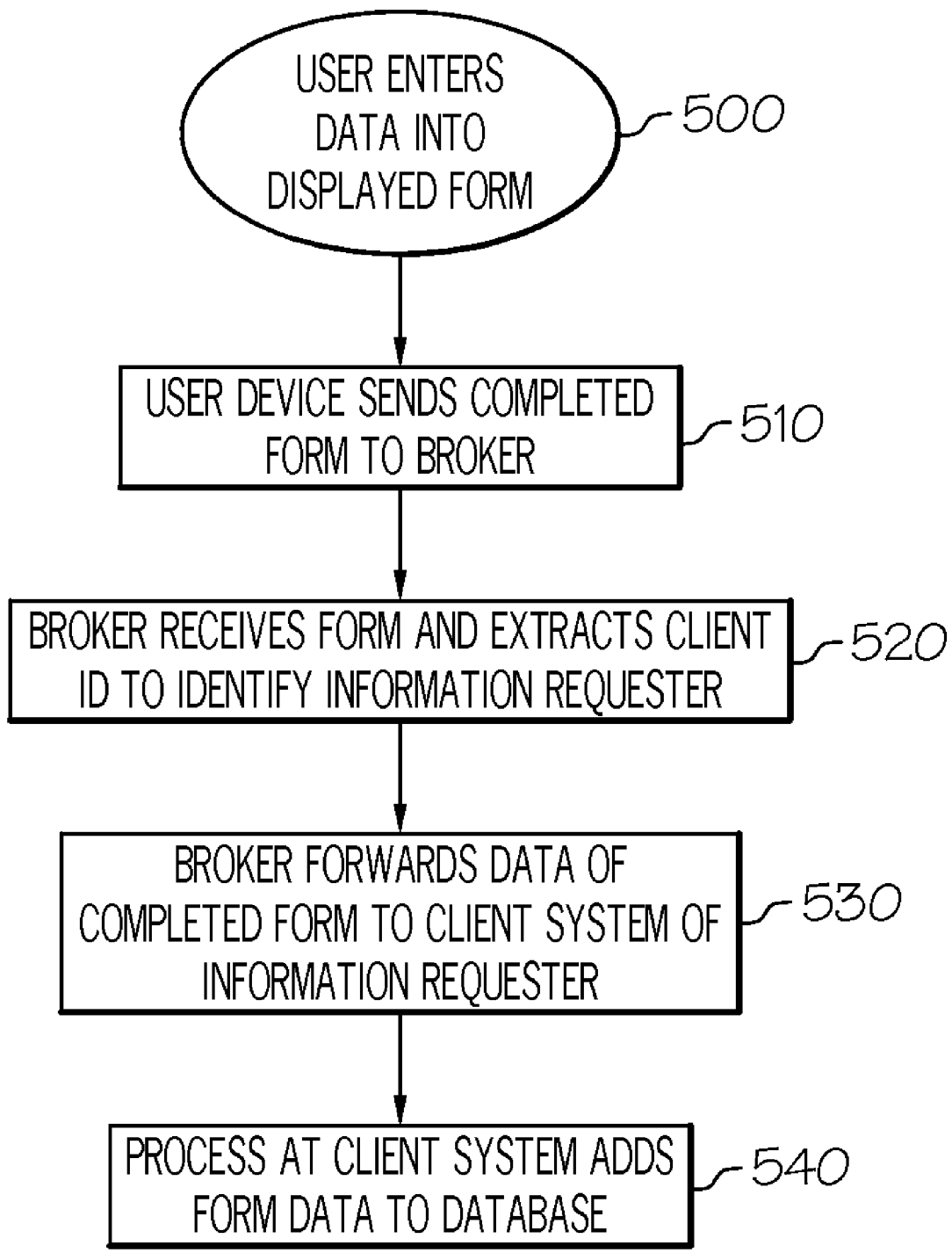

FIGS. 3A to 3C represent various operational steps of a method implementing the invention. The information requester may be a business wishing to elicit requests for copies of their sales catalogue or product brochure. The information requester designs a form using conventional programming tools, or chooses one of a standard set of predefined forms. The electronic form may be complex, comprising multiple form components including multiple labeled entry fields and selection lists, or the form may comprise a single form component such as a check box with two or three numbered options. Example forms are shown below in FIGS. 5A to 5F.

Having designed a new form, the information requester sends 300 the newly designed form from the client system 80 to the broker 70 and requests 310 registration with the broker's forms manager 110. This registration sequence is shown in FIG. 3A. The forms manager 110 registers 320 the client system 80 of the information requester entity and processes 320 the new form. In one embodiment, the registration step involves allocation by the forms manager 110 of an entity-unique client ID and determination of the required label dictionary (if more than one dictionary is stored at the broker). Although a broker-unique Client ID is possible, Client IDs can be assigned separately for each specific form descriptor codes, and then the uniqueness requirement is merely that the form descriptor code be unique for a given combination of a Client ID and a form descriptor code.

Subsequently, one or more characters within a published form descriptor code indicate the information requester's clientID. When forms are completed by device users and returned to the broker, the forms manager 110 extracts the clientID from a returned form and the broker uses this to route the form to the appropriate client system 80 of the information requester.

The broker receives the new form and the forms manager 110 compares 320 the form components with its data repository 100 in which form components and their attributes are represented by a digital bit string. The data repository 100 at the broker includes the data $30_N$ of each of the repositories 30 of individual devices N. That is, each user device stores mappings between input characters and digital representations, and associations between digital representations and form components and their attributes. The data repository 100 at the broker 70 stores the same information as each user device as well as, when required, different associations between digital representations and label attributes (i.e. different label dictionaries).

If each component and its respective attributes have a corresponding entry in the repository 100, the broker returns 330 to the client system 80 the clientID, the identified set of bit strings corresponding to the set of form components, a dictionary of labels in which words and phrases are associated with bit strings, and the set of alphanumeric characters of a form descriptor code that map to this set of bit strings.

Now the information requester has sufficient detail to be able to publish a form descriptor code within their advertisements. Let us assume that the forms manager of the broker assigned a form descriptor code AWC674, with characters AWC6 defining the new form and characters 74 being the clientID. This example code is merely illustrative—a subset of the bit string that maps to a single input character may suffice as the Client ID.

If, however, the repository 100 does not have a corresponding entry for one or more of the required form components or its attributes, a classification process running at the broker assigns a new digital representation to the component or attributes (or to the combination of component and attributes). Since the component types and their attributes are organized within hierarchical classes, the classification process attempts to identify at least one relevant branch within the existing class hierarchies in which to classify the new component and/or attributes. If this fails, a new class will be defined to the forms manager and associated with a previously-unallocated bit string.

The information requester publishes an advertisement that includes the form descriptor code AWC674 and an invitation to use the corresponding form (AWC6) to order a product catalogue from the information requester (74). As mentioned above, addressing information for the broker may be hard coded into the user's device. Alternatively, an advertisement may also specify address information to send the form to—such as a contact telephone number, e-mail address or equivalent address of the broker 70. In other embodiments of the invention, published address information comprises a direct contact number or address for the client system 80 of the information requester.

A user of a mobile device 10 who sees the advertisement can decide to respond to the invitation, and so selects a form generation option from menus displayed on their device. The user is prompted to enter the form descriptor code (and possibly a contact telephone number or other address information read from the advertisement), using the device input keys. Referring to FIG. 3B, a device user responds to the advertisement by typing 400 the form descriptor code AWC674. In some embodiments, the form descriptor code and address information are entered as a single data string.

The form generator 20 then processes the input form descriptor code, initially extracting 410 the clientID for sending on to the broker and then applying 420 stored mappings from repository 30 to the remaining characters AWC6. As described above, this application of mappings obtains a set of representative digital bit strings. Referring again to the example of Table 1, AWC6 maps to bit strings 01010, 111110, 01100, 00110 (in this case 01010 is a different component type from the examples shown in FIG. 2A). As described above, the form generator then refers to its stored associations between bit strings and form components to identify 430 one or more Java classes and attributes corresponding to the bit strings. The form generator instantiates 440 the identified classes to generate a set of one or more form components and arranges the components in a sequence corresponding to the sequence of characters within the input form descriptor code.

If an input form descriptor code specifies a dictionary that is not held on the user's device, a copy of the dictionary may be obtained from the broker and then referred to when applying labels to a form generated on the user's device. However, in the preferred embodiment each user device has a standard dictionary installed thereon, to enable offline form generation.

The instantiated Java classes generate form components as described above and display 450 a first page of the generated form on the display screen of the device 10. If implemented in WML, a form may be separated into a series of separately displayable pages. In other environments, a portion of the form may be displayed together with a scroll bar for scrolling to other parts of the form. In general, the particular appearance of the form on the user's device will depend on the device interface capabilities as well as the form's structure as specified by the form designer. The labeling of the form (determined by attributes within the form descriptor code) indicates to the user what data should be entered into the form.

Referring to FIG. 3C, data is entered 500 by the user, either by typing via the device input keys, by dictation input to a speech-recognition program, or by copying from stored files etc., according to user preferences and the capabilities of the user's device. The particular data entry mechanism used is not significant to the present invention.

After the user has entered required data, the completed form is transmitted 510 to the broker, for example via conventional SMS messaging or WAP communication protocols in the case of a generated WML form, using the contact number entered earlier, and including the clientID with the form.

The broker receives 520 the form and identifies 520 the target client system 80 from the clientID, and then forwards 530 the completed form to the client system 80. A process running at the client system is expecting to receive data in the particular format of the form, and so data can be easily extracted 540 and added 540 to a database at the client system 80. In some embodiments, the broker may provide services for extracting and aggregating results on behalf of the information requester, and then the information requester's client system 80 receives only the aggregated data or a summary report on the received data. The broker may provide additional services such as post code formatting or other data filtering.

FIG. 4 is an illustration of the type of data that may be stored in repository 100 at the broker 70, including form descriptor codes 600 that comprise a component identifier 610 and a client ID 620. The broker also stores information requester address information 630 associated with the client ID.

(F) Extensions and Example Applications

In other embodiments of the invention, although a form is displayed on a device screen and completed by the user, the form is transmitted to the broker in a compressed format. The user entered data is extracted from a completed form and only this user-entered data and the form descriptor code are sent to the broker. The broker then recreates the form with the data in appropriate fields. In yet another embodiment, forms (or user-entered data and form descriptor codes) are not sent to client systems via a broker, but are transmitted directly from the user devices to a telephone number or e-mail address of the information requester.

The above description notes the flexibility to define short codes to represent common form components. In practice, many information requesters will design forms with many elements in common, such as combining an address entry field with a name entry field. Descriptor code elements may be defined for common combinations of form components, common combinations of component types and labels, or even for complete electronic form designs.

If the form generator program code 20 running on a user's device 10 is unable to interpret one or more characters of a form descriptor code, the form generator program code may identify this as a failure requiring an update to the stored mappings table on the user's device. Any such interpretation failures can prompt the form generator program code 20 to send a request to the broker 70, requesting a copy of the latest mappings table 30. Any new mappings that have been recently defined (identifying characters that have been assigned as references to a type of form component or its attributes) are then replicated to the particular user's device to facilitate interpretation. This enables updates and extensions to the above-described dynamic generation of forms using stored mappings. However, this option for regular downloading of updates is not essential to the invention, and preferred embodiments of the invention achieve an offline forms generation capability by working within the limits of a set of predefined mappings and class hierarchies subject to periodic backwardly compatible updates.

To illustrate how the present invention may be used, a number of example applications will now be described with reference to FIGS. 5A-5F. In a first example, Company A is a music magazine publisher. Company A publishes a form descriptor code that can be interpreted to generate generic form components—a drop down menu and a table without application-specific labeling, as shown in FIG. 5A. Company A also supplements the form descriptor code with instructions for how users can make use of the generated form. Thus, advertisements in different media display a form descriptor code together with instructions such as:

From the drop down menu, select the number for how you found out about this competition:

1—friend, 2—magazine, 3—online, 4—from flyer. Enter your answer for each multiple choice question in the competition in the table, matching the numbers of the questions to the numbers in the table.

In a second example, Company B is a radio station. The form descriptor code, that is published by Company B and is input by device users, is interpreted by the form generator to generate form components that are customized with application-specific labeling. Such a customized form is shown in FIG. 5B. Because the form itself includes more context-specific information, Company B is able to publish less explanatory text than in the example of FIG. 5A.

In a third example, Company C is an airline. Company C uses a form descriptor code that is used by the forms generator to generate some form components that are industry-specific. Company C can access and validate specialized components that have been designed and registered for Company C. FIG. 5C shows an example in which information about airline gates, seats and delays can be obtained. The form ensures that a customer specifies flight details in a valid format, such that an accurate query is submitted to Company C to obtain flight information.

The example form shown in FIG. 5D may be used when adding a frequent flyer number to a flight booking. Different airlines have frequent flyer numbers and electronic ticket (e-ticket) numbers in different formats. The "electronic ticket number" label of an entry field component shown in FIG. 5D is generated dynamically in response to specifying an airline that issues e-tickets, and an alternative field label is displayed for airlines that do not issue e-tickets.

FIG. 5E shows another example form, such as may be used by a retail company—Company D. In this example, Company D publishes a form descriptor code that causes the form generator to generate form components that are affected by customer preferences stored on the customer's telephone. The first time the customer uses a form to enter customer-specific preferences, such as a payment option (for example, debit card or credit card), form components required for validating the payment are dynamically generated according to the specified type of payment. For example a bank sort code, account number and card issue number may be required to validate a debit card payment; whereas a credit card number and expiry date may be required to validate a credit card payment. The payment option and required form components are then stored on the telephone and automatically selected as a default payment option next time a form is generated that requires the user to select a payment option. The account number and other payment information could be saved as well, but security concerns typically discourage that approach. As another example, a user may specify a favorite color such as 'blue' as a default color for purchases, and then a drop down color menu may display the option 'blue' as a default selection until changed by the user. The example form of FIG. 5E may be generated when purchasing a product in response to an advertisement published in a magazine or on a billboard.

Company E is a pizza delivery company. Company E publishes a form descriptor code that is responded to by the form generator to generate a simple request form, such as shown in FIG. 5F. When the user completes the simple request form and transfers this request to Company E, a more complex code is returned to the user's device. The form generator then responds to the more complex code by displaying a more complex form on the user's device screen. This iterative data flow will be more acceptable to users if communication delays are short. However, this approach has the advantage that an initial user input can be very simple, and then the form descriptor code that is returned to the user's device can be more complex than would be practical for manually-entered codes. The returned complex descriptor code facilitates generation of a relatively complex order form for completion by the user. The initial request form sent to Company E may request a menu, and this request may be sent to the broker 70. The relatively complex form descriptor code returned to the user's device may include address information enabling the completed order form to be sent directly to Company E. For example, the complex form descriptor code returned to the user's device could be a detailed pizza menu with prices and radio buttons for selecting choices. The user may make their choices and specify a delivery address and payment details, and then transmit the order form to request delivery of a pizza.

Yet another example application involves users entering a form descriptor code that maps to a product identifier (similar to a barcode). The generated form can be transmitted to request a number of price comparisons between an equivalent product in several stores within a local area (specified by post code for example).

What is claimed is:

1. A method for generating an electronic form on a data processing device, comprising:
   receiving an input of a form descriptor code comprising a plurality of characters that represent components of an electronic form;
   comparing characters of the form descriptor code with stored mappings between characters and electronic form components, to determine required components of an electronic form; and
   generating an electronic form that comprises the determined required electronic form components, wherein the comparing and generating are performed by a processor of the data processing device.

2. The method of claim 1, wherein the received input comprises entry of a form descriptor code via a user input mechanism of the data processing device, and wherein comparing and generating are performed off-line.

3. The method of claim 1, wherein generating an electronic form comprises displaying the generated electronic form on a display device of the data processing device and arranging the determined required electronic form components within the generated electronic form in a sequence corresponding to the sequence of characters within the form descriptor code.

4. The method of claim 1, further comprising comparing characters of the form descriptor code with stored mappings between characters and addressing information, for determining an address to transmit the generated electronic form to.

5. The method of claim 4, further comprising:
   responsive to a user of the data processing device entering data into the electronic form and requesting submission of the form, transmitting the user-entered data to the determined address.

6. The method of claim 4, wherein the determined address is an input address of an intermediate broker for handling communications between said data processing device and a data processing system of an information requester registered with the broker, and wherein the broker is adapted to forward the transmitted user-entered data to the data processing system of the information requester.

7. The method of claim 1, wherein comparing the form descriptor code with stored mappings comprises:
   performing a lookup operation to identify a set of one or more bit strings representing form components and attributes of the form components, and
   interpreting the one or more bit strings to determine the required form components and attributes.

8. The method of claim 7, wherein a set of form component types are organized in a hierarchy and specific form component types are associated with specific locations in the hierarchy identified by bit sequences, and wherein interpreting the one or more bit strings comprises identifying locations in the hierarchy corresponding to the one or more bit strings identified by said lookup operation.

9. The method of claim 1, further comprising calculating a checksum for a set of characters within the form descriptor code and comparing the calculated checksum with a character at a predefined position within the form descriptor code, to check validity of the form descriptor code.

10. The method of claim 1, wherein the form descriptor code is received via a user input mechanism of the data processing device.

11. The method of claim 1, wherein the form descriptor code is received at the data processing device via network communications.

12. A computer program product comprising program code recorded on a computer usable storage recording medium, for controlling a data processing apparatus to dynamically generate an electronic form, the program code comprising:
   program code, responsive to an input form descriptor code that comprises a plurality of characters representing components of an electronic form, for comparing the characters of the input form descriptor code with stored mappings between characters and electronic form components to determine required components; and
   program code for generating an electronic form that comprises the determined required form components.

13. The computer program product of claim 12, wherein the program code for comparing and generating is responsive to user input of a form descriptor code via a user input mechanism of the data processing apparatus to perform the comparing and generating off-line on the data processing device.

14. The computer program product of claim 12, wherein the program code for generating an electronic form comprises a set of instantiable object classes corresponding to a set of form components.

15. The computer program product of claim 14, wherein the instantiable object classes include attributes corresponding to a set of text labels for the form components.

16. A data processing device comprising a data processing unit, a data storage unit, a display device and a form generator for controlling the device to dynamically generate an electronic form, wherein the form generator comprises:
   program code, responsive to an input form descriptor code that comprises a plurality of characters representing components of an electronic form, for comparing the characters of the input form descriptor code with stored mappings between characters and electronic form components to determine required components; and
   program code for generating an electronic form that comprises the determined required form components.

17. The method of claim 1, wherein the form descriptor code is a continuous alphanumeric string.

* * * * *